US012343672B2

(12) United States Patent
Kapustin et al.

(10) Patent No.: US 12,343,672 B2
(45) Date of Patent: Jul. 1, 2025

(54) ATMOSPHERIC WATER HARVESTING SYSTEM

(71) Applicant: Water Harvesting, Inc., Newark, CA (US)

(72) Inventors: Ievgen Kapustin, Newark, CA (US); David S. Kuo, Newark, CA (US)

(73) Assignee: Water Harvesting, Inc., Lakeview, CA (US)

( * ) Notice: Subject to any disclaimer, the term of this patent is extended or adjusted under 35 U.S.C. 154(b) by 490 days.

(21) Appl. No.: 17/951,956

(22) Filed: Sep. 23, 2022

(65) Prior Publication Data

US 2024/0100466 A1  Mar. 28, 2024

(51) Int. Cl.
*B01D 53/04* (2006.01)
*B01D 53/26* (2006.01)
*E03B 3/28* (2006.01)

(52) U.S. Cl.
CPC ..... *B01D 53/0438* (2013.01); *B01D 53/0446* (2013.01); *B01D 53/0454* (2013.01); *B01D 53/265* (2013.01); *B01D 2253/204* (2013.01); *B01D 2257/80* (2013.01)

(58) Field of Classification Search
CPC ............... B01D 53/04; B01D 53/0438; B01D 53/0446; B01D 53/0454; B01D 53/265; B01D 53/261; B01D 2253/204; B01D 2257/80; E03B 3/28
USPC .......... 96/109–112, 121–123, 126–128, 130, 96/143, 146, 154; 95/1, 10, 14, 23, 95/121–124, 126
See application file for complete search history.

(56) References Cited

U.S. PATENT DOCUMENTS

| 1,559,762 | A | 11/1925 | Newman |
| 4,180,985 | A | 1/1980 | Northrup, Jr. |
| 4,304,577 | A | 12/1981 | Ito et al. |
| 4,646,541 | A | 3/1987 | Reid et al. |
| 5,565,139 | A | 10/1996 | Walker et al. |
| 5,632,802 | A | 5/1997 | Grgich et al. |
| 5,632,954 | A | 5/1997 | Coellner et al. |

(Continued)

FOREIGN PATENT DOCUMENTS

| CA | 3120865 | 7/2023 |
| CN | 102639540 A | 8/2012 |

(Continued)

OTHER PUBLICATIONS

PCT International Patent Application No. PCT/US23/33101, International Search Report and Written Opinion of the International Searching Authority dated Feb. 8, 2024, 16 pages.

(Continued)

*Primary Examiner* — Frank M Lawrence, Jr.
(74) *Attorney, Agent, or Firm* — Craig R. Miles; CR MILES P.C.

(57) ABSTRACT

Generally, an atmospheric water harvester useful in harvesting water from surrounding air. Specifically, a water harvester configured to reduce the sensible heat penalty associated with heating of a volume of air in the desorption mode and cooling of the volume of air in the condensation mode of the atmospheric water harvesting system, and methods of making the water harvester and methods of using the water harvester to collect water with a reduced sensible heat penalty contribution to total energy cost per liter of collected water.

23 Claims, 5 Drawing Sheets

(56) References Cited

U.S. PATENT DOCUMENTS

| | | |
|---|---|---|
| 6,074,972 A | 6/2000 | Bratton et al. |
| 6,334,316 B1 | 1/2002 | Maeda |
| 6,684,648 B2 | 2/2004 | Faqih |
| 8,500,886 B2 | 8/2013 | Okano |
| 8,627,673 B2 | 1/2014 | Hill et al. |
| 8,864,882 B2 | 7/2014 | Kametani |
| 9,134,038 B2 | 9/2015 | Lee et al. |
| 9,446,969 B1 | 9/2016 | Redman et al. |
| 10,168,057 B2 | 1/2019 | Goldsworthy et al. |
| 10,266,737 B2 | 4/2019 | Van Horn et al. |
| 10,695,741 B2 | 6/2020 | Motkuri et al. |
| 10,829,913 B1 | 11/2020 | Ahmed et al. |
| 10,857,855 B2 | 12/2020 | Tomita et al. |
| 10,948,202 B2 | 3/2021 | Lee et al. |
| 11,029,045 B2 | 6/2021 | Woods et al. |
| 11,065,573 B2 | 7/2021 | Matuska et al. |
| 11,679,339 B2 | 6/2023 | Van de Mortel |
| 12,000,122 B2 | 6/2024 | Yaghi et al. |
| 12,098,530 B1 | 9/2024 | Kapustin et al. |
| 2004/0107832 A1 | 6/2004 | Tongue et al. |
| 2004/0123615 A1 | 7/2004 | Yabu |
| 2004/0123616 A1 | 7/2004 | Lee et al. |
| 2004/0244398 A1 | 12/2004 | Radermacher et al. |
| 2005/0044862 A1 | 3/2005 | Vetrovec et al. |
| 2006/0130652 A1 | 6/2006 | Takewaki et al. |
| 2007/0028769 A1 | 2/2007 | Eplee et al. |
| 2009/0139254 A1 | 6/2009 | Landry |
| 2009/0151368 A1 | 6/2009 | Bar |
| 2009/0260385 A1 | 10/2009 | Hill et al. |
| 2010/0126344 A1 | 5/2010 | Stein et al. |
| 2010/0175557 A1 | 7/2010 | Shih et al. |
| 2011/0056220 A1 | 3/2011 | Caggiano |
| 2011/0088552 A1 | 4/2011 | Ike et al. |
| 2011/0296858 A1 | 12/2011 | Caggiano |
| 2012/0172612 A1 | 7/2012 | Yaghi et al. |
| 2013/0036913 A1 | 2/2013 | Fukudome |
| 2013/0061752 A1 | 3/2013 | Farha et al. |
| 2013/0192281 A1 | 8/2013 | Nam et al. |
| 2013/0269522 A1 | 10/2013 | DeValve |
| 2013/0312451 A1 | 11/2013 | Max |
| 2014/0138236 A1 | 5/2014 | White |
| 2014/0165637 A1 | 6/2014 | Ma |
| 2014/0287150 A1 | 9/2014 | Miljkovic et al. |
| 2014/0326133 A1 | 11/2014 | Wang et al. |
| 2014/0338425 A1 | 11/2014 | Kalbassi et al. |
| 2016/0030858 A1 | 2/2016 | Giacomini |
| 2016/0084541 A1 | 3/2016 | Aguado et al. |
| 2016/0334145 A1 | 11/2016 | Pahwa et al. |
| 2017/0008915 A1 | 1/2017 | Yaghi et al. |
| 2017/0113184 A1 | 4/2017 | Eisenberger |
| 2017/0129307 A1 | 5/2017 | Zhou et al. |
| 2017/0211851 A1 | 7/2017 | Feng et al. |
| 2017/0234576 A1 | 8/2017 | Kawagoe et al. |
| 2017/0292737 A1 | 10/2017 | Moon |
| 2017/0354920 A1 | 12/2017 | Switzer et al. |
| 2018/0043295 A1* | 2/2018 | Friesen .............. B01D 53/14 |
| 2018/0171604 A1 | 6/2018 | Kim et al. |
| 2018/0209123 A1 | 6/2018 | Bahrami et al. |
| 2018/0261882 A1 | 9/2018 | Chang et al. |
| 2019/0100903 A1 | 4/2019 | Panda et al. |
| 2019/0234053 A1 | 8/2019 | Kim et al. |
| 2019/0323714 A1 | 10/2019 | Cui |
| 2020/0009497 A1 | 1/2020 | Matuska et al. |
| 2020/0182734 A1 | 6/2020 | Ueno et al. |
| 2020/0206679 A1 | 7/2020 | Stuckenberg |
| 2020/0283997 A1 | 9/2020 | Salloum et al. |
| 2020/0316514 A1 | 10/2020 | Fuchs et al. |
| 2020/0363078 A1 | 11/2020 | Mulet et al. |
| 2021/0062478 A1 | 3/2021 | Friesen et al. |
| 2021/0156124 A1 | 5/2021 | Yaghi et al. |
| 2021/0237535 A1 | 8/2021 | Goel et al. |
| 2021/0283528 A1 | 9/2021 | Pokorny et al. |
| 2021/0283574 A1 | 9/2021 | Yaghi et al. |
| 2021/0394114 A1* | 12/2021 | Schmaelzle .......... B01D 53/261 |
| 2022/0001328 A1 | 1/2022 | Yoon et al. |
| 2022/0106203 A1 | 4/2022 | Marchon et al. |
| 2022/0170247 A1 | 6/2022 | Yaghi et al. |
| 2022/0389691 A1 | 12/2022 | Kuo et al. |
| 2023/0063572 A1 | 3/2023 | Kapustin |
| 2023/0264138 A1 | 8/2023 | McGrail et al. |

FOREIGN PATENT DOCUMENTS

| | | |
|---|---|---|
| CN | 106029674 A | 10/2016 |
| CN | 205718197 | 11/2016 |
| CN | 1077722290 A | 2/2018 |
| CN | 114182784 A | 3/2022 |
| CZ | 2018-337 | 7/2019 |
| EP | 0816225 A1 | 1/1998 |
| EP | 2507247 A1 | 10/2012 |
| EP | 3721971 A1 | 10/2020 |
| GB | 2540798 A | 2/2017 |
| JP | S63-107720 A | 5/1988 |
| JP | 2013-512223 A | 4/2013 |
| JP | 2017-509607 A | 4/2017 |
| JP | 2018080146 A | 5/2018 |
| WO | WO 03/097216 A1 | 11/2003 |
| WO | 2015/127033 A1 | 8/2015 |
| WO | WO2016/186454 A1 | 11/2016 |
| WO | WO 2018/118377 A1 | 6/2018 |
| WO | WO 2018/230430 A1 | 12/2018 |
| WO | WO 2019/010102 A1 | 1/2019 |
| WO | WO 2019/058158 A1 | 3/2019 |
| WO | WO 2019/082000 A1 | 5/2019 |
| WO | WO 2019/152962 A2 | 8/2019 |
| WO | WO 2020/036905 A1 | 2/2020 |
| WO | WO 2020/099561 A1 | 5/2020 |
| WO | WO 2020/112899 A1 | 6/2020 |
| WO | WO 2020/154427 A1 | 7/2020 |
| WO | WO 2021/034477 A1 | 2/2021 |
| WO | WO 2021/067179 A1 | 4/2021 |
| WO | WO 2021/162894 A1 | 8/2021 |
| WO | WO 2023/146800 A1 | 8/2023 |
| WO | WO 2023/181058 A1 | 9/2023 |

OTHER PUBLICATIONS

U.S. Appl. No. 17/763,413, Office Action mailed Feb. 6, 2024.
U.S. Appl. No. 18/077,417, Office Action mailed Mar. 29, 2024.
U.S. Appl. No. 18/371,700, Office Action mailed Apr. 18, 2024.
PCT International Patent Application No. PCT/IN23/50258, International Search Report and Written Opinion of the International Searching Authority dated Jul. 4, 2023, 10 pages.
Japanese Patent Application No. 2021-529709, Office Action dated Nov. 21, 2023, 6 pages.
U.S. Appl. No. 18/384,992, Office Action mailed Jan. 23, 2024.
U.S. Appl. No. 18/077,417, Office Action mailed Jan. 17, 2024.
PCT International Patent Application No. PCT/US19/63442, International Search Report and Written Opinion of the International Searching Authority dated Jan. 22, 2020, 7 pages.
PCT International Patent Application No. PCT/US20/14647, International Search Report and Written Opinion of the International Searching Authority dated May 5, 2020, 11 pages.
PCT International Patent Application No. PCT/US20/53052, International Search Report and Written Opinion of the International Searching Authority dated Jan. 4, 2021, 10 pages.
PCT International Patent Application No. PCT/US21/16261, International Search Report and Written Opinion of the International Searching Authority dated Apr. 16, 2021, 8 pages.
PCT International Patent Application No. PCT/US21/47491, International Search Report and Written Opinion of the International Searching Authority dated Dec. 7, 2021, 9 pages.
PCT International Patent Application No. PCT/US22/12990, International Search Report and Written Opinion of the International Searching Authority dated Apr. 7, 2021, 14 pages.
PCT International Patent Application No. PCT/US22/26153, International Search Report and Written Opinion of the International Searching Authority dated Jul. 28, 2022, 18 pages.
Ding et al. Carbon capture and conversion using metal-organic frameworks and MOF-based materials. Chem. Soc. Rev., May 2019, 48(2):2783-2828.

(56) References Cited

OTHER PUBLICATIONS

Fracaroli et al. Metal-Organic Frameworks with Precisely Designed Interior for Carbon Dioxide Capture in the Presence of Water. Am. Chem. Soc., Jun. 2014, 136, pp. 8863-8866.
Furukawa et al. Water Adsorption in Porous Metal-Organic Frameworks and Related Materials. J. Am. Chem. Soc., Mar. 2014, 136(11): 4369-4381.
Hanikel et al. Rapid Cycling and Exceptional Yield in a Metal-Organic Frameworks for Water Harvester. ACS Cent. Sci., Aug. 2019, 5(10):1699-1706.
Kalmutzki et al. Metal-Organic Frameworks for Water Harvesting from Air; Adv. Mater. Sep. 2018, 30(37):1704304.
Kim et al. Water harvesting from air with metal-organic frameworks powered by natural sunlight. Science, Apr. 2017, 356:430-434.
Kummer et al. A functional full-scale heat exchanger coated with aluminum fumarate metal-organic framework for adsorption heat transformation. Ind. Eng. Chem. Res., Jul. 2017, 56(29):8393-8398.
Li et al. Incorporation of Alkylamine into Metal-Organic Frameworks through a Brønsted Acid-Base Reaction for CO2 Capture. ChemSusChem., Oct. 2016, 9(19):2832-2840.
Tu et al. Progress and Expectation of Atmospheric Water Harvesting. Joule, Aug. 2018, 2(8):1452-1478.
Zhou et al. Atmospheric Water Harvesting: A Review of Material and Structural Designs. ACS Materials Lett., May 2020, 2(7):671-684.
PCT International Patent Application No. PCT/US23/33098, International Search Report and Written Opinion of the International Searching Authority dated Nov. 30, 2023, 11 pages.
U.S. Appl. No. 17/424,147, Office Action mailed Oct. 2, 2023.
Brazilian Patent Application No. BR112021010139-0, Office Action mailed Jul. 9, 2023, 4 pages.
Brazilian Patent Application No. BR112021002648-7, Office Action mailed Jul. 3, 2023, 4 pages.
Canadian Patent Application No. 3,171,282, Office Action dated Oct. 27, 2023, 11 pages.
Canadian Patent Application No. 3,167,734, Office Action dated Aug. 31, 2023, 6 pages.
Philippine Patent Application No. 1/2021/551201, Substantive Examination Report dated Sep. 6, 2023, 6 pages.
Canivet et al. Water adsorption in MOFs: fundamentals and applications. Chem. Soc. Rev., Aug. 2014, 43(16):5594-5617.
Clus et al. Study of dew water collection in humid tropical islands. Hydrol., Oct. 2008, 361(1-2):159-171.
Fathieh et al. Practical water production from desert air. Sci. Adv., Jun. 2018, 4(6):eaat3198.
Klemm et al. Fog as a Fresh-Water Resource: Overview and Perspectives. Ambio, May 2012, 41(3):221-234.
Lee et al. Water harvest via dewing. Langmuir, Jun. 2012, 28(27):10183-10191.
Muselli et al. Dew water collector for potable water in Ajaccio (Corsica Island, France). Atmos. Res., Sep. 2002,64,297-312.
Park et al. Optimal Design of Permeable Fiber Network Structures for Fog Harvesting. Langmuir, Oct. 2013, 29(43):13269-13277.
Schemenauer et al. A Proposed Standard Fog Collector for Use in High-Elevation Regions. Appl. Meteorol., Nov. 1994, 33(11):1313-1322.
Wahlgren. Atmospheric Water Vapour Processor Designs for Potable Water Production: A Review. Water Res., Jan. 2001, 35(1):1-22.
Janiak et al. Solid-Solution Mixed-Linker Synthesis of Isoreticular Al-Based MOFs for and Easy Hydrophilicity Tuning in Water-Sorption Heat Transformations. Chem. Mater., May 2019, 31, 11, 4051-4062.
Fang et al. One-Pot Synthesis of Two-Linker Mixed Al-Based Metal-Organic Frameworks for Modulated Water Vapor Adsorption. Cryst. Growth Des., Aug. 2020, 20, 10, 6565-6572.
Global Cooling Prize. Transaera and partner Haier. Website, https://globalcoolingprize.org/transaera-inc/, originally downloaded Nov. 21, 2022, 3 pages.
Gleick. Water in Crisis: A Guide to the World's Fresh Water Resources. Chapter 2, pp. 13-24. Aug. 1993, Oxford University Press, New York, USA.
European Patent Application No. 21754205.9, Extended European Search Report mailed Apr. 19, 2024. 8 pages.
Singapore Patent Application No. 11202252723Y, Office Action mailed Oct. 31, 2024, 8 pages.
European Patent Application No. EP 19891188.5, Office Action dated Jan. 26, 2024, 7 pages.
European Patent Application No. EP 19891188.5, Response to Office Action filed Apr. 9, 2024, 14 pages.
Lu et al. Tuning the structure and function of metal-organic frameworks via linker design. Chemical Society Reviews, Jan. 2014, 43(16):5561-5593.
PCT International Patent Application No. PCT/US22/41142, International Search Report and Written Opinion of the International Searching Authority dated Jan. 20, 2023, 12 pages.
PCT International Patent Application No. PCT/US24/49250, International Search Report and Written Opinion of the International Searching Authority dated Feb. 20, 2025, 14 pages.

\* cited by examiner

ATMOSPHERIC WATER HARVESTING SYSTEM

I. FIELD OF THE INVENTION

Generally, an atmospheric water harvester useful in harvesting water from surrounding ambient atmosphere. Specifically, a water harvester configured to reduce the sensible heat penalty associated with heating of a volume of air in the desorption mode and cooling of the volume of air in the condensation mode of the atmospheric water harvesting system, and methods of making the water harvester and methods of using the water harvester to collect water with a reduced sensible energy penalty contribution to total energy cost per liter of collected water.

II. BACKGROUND

Conventionally, the process of harvesting water from surrounding ambient atmosphere using water capture materials comprises a water harvesting cycle including three energy-intensive modes: adsorption of water from the surrounding ambient atmosphere to a water capture material; desorption of water vapor from the water capture material; and condensation of desorbed water vapor into liquid water. The water adsorption mode can be initiated by flowing ambient atmosphere across a desorbed water capture material. The molecules of water in the ambient atmosphere can become adsorbed by the water capture material. The water adsorption mode can conclude when the water capture material becomes partially or fully water saturated. Following the adsorption mode, a water desorption mode can be initiated by directly or indirectly heating the partially or fully water saturated water capture material to release water vapor. The desorption mode can be concluded when the water capture material becomes partially or fully desaturated of water. The condensation mode can be initiated by cooling the water vapor released by the water capture material. The condensation mode can be concluded by partial or full condensation of water from the cooled water vapor. Through repetitive cycles of adsorption, desorption and condensation, water can be harvested from the ambient atmosphere.

A water harvesting cycle can involve heating of a volume of air in a first chamber containing or thermally coupled to the water capture material in the desorption mode and subsequent cooling of the same volume of air in a second chamber in the condensation mode. The same volume of air can be recirculated between the first chamber and the second chamber in successive water harvesting cycles. The re-heating and re-cooling of the air requires a significant sensible energy portion related to sensible cooling of a "desorption-to-condensation" airflow, and heating of a "condensation-to-desorption" airflow.

There would be a substantial advantage in a water harvesting system configured, or a water harvesting cycle implemented, to reduce or cancel out the penalty inherited from the sensible cooling of the "desorption-to-condensation" airflow stream and/or heating of the "condensation-to-desorption" airflow which by comparison to conventional water harvesting systems reduces the total energy cost per liter of water produced during one or more water harvesting cycles.

III. SUMMARY OF THE INVENTION

Provided herein are water harvesting systems that can reduce overall energy costs in the water harvesting cycle and/or improve efficiency in water production during the water harvesting cycle.

A broad object of embodiments of the invention can be to provide an atmospheric water harvester comprising one or more of: a first chamber containing or coupled to a water capture material, wherein the water capture material adsorbs water from surrounding ambient atmosphere in an adsorption mode of the water harvester and desorbs water vapor in a desorption mode of the water harvester; a heating source thermally coupled to said water capture material contained in the first chamber, the heat source operable to heat the water capture material to desorb water vapor during the desorption mode of the water harvester; a second chamber fluidically coupled to the first chamber, wherein water vapor carried in an airflow recirculates between the first chamber and the second chamber during the desorption mode of said water harvester; a cooling source thermally coupled to the second chamber, wherein the cooling source operable to cool the water vapor carried in said airflow recirculated between the first chamber and the second chamber during the condensation mode of the water harvester; and an airflow heat exchanger through which the air flow passes to transfer heat between the airflow from said first chamber and the airflow from the second chamber.

In particular embodiments, the airflow heat exchanger can be disposed in a fixed spatial configuration, or can be reconfigured during the water harvesting cycle, to transfer heat between the airflow from said first chamber and the airflow from the second chamber at a heat transfer rate which reduces, substantially reduces or cancels the sensible heat penalty, and/or avoids condensation of the water vapor prior entering the second chamber. Particular embodiments can include a controller including a processor communicatively coupled to a non-transitory computer readable memory containing a computer code executable to analyze one or more signals from one or more sensors, wherein the one or more signals vary based on change in one or more of: airflow temperature, airflow humidity, and airflow rate of the airflow passing through the airflow heat exchanger, wherein the controller can operate based on analysis of the signals from the one or more sensors to control one or more of: the heat source, the cooling source, the configuration of the airflow heat exchanger, and the airflow rate through the airflow heat exchanger to reduce or cancel the sensible heat penalty in the system or associated with cooling of the "desorption-to-condensation" airflow and/or heating of the "condensation-to-desorption" airflow to reduce the total energy expenditure per liter of water produced during one or more water harvesting cycles.

In particular embodiments, the heating source can comprise a first heat exchanger through which heated fluid circulates, wherein the first heat exchanger can be configured to transfer heat from the heated fluid to the water capture material contained in or thermally coupled to the first chamber, and/or the cooling source can comprise a second heat exchanger through which cooled fluid circulates, wherein the second heat exchanger can be configured to transfer heat from the airflow carrying the water vapor contained in said second chamber. In particular embodiments, the heating source can comprise a condenser of a heat pump and/or the cooling source can comprise an evaporator of a heat pump.

Another broad object of the invention can be a method of making a water harvester including one or more of: containing or thermally coupling a water capture material to a first chamber, wherein the water capture material adsorbs water from surrounding ambient atmosphere in an adsorption mode of the water harvester, and wherein the water capture material desorbs water vapor in a desorption mode of the water harvester; thermally coupling a heating source to the water capture material contained in or thermally coupled to the first chamber, wherein the heat source can operate to heat the water capture material to desorb water vapor during the desorption mode of said water harvester; fluidically coupling a second chamber to the first chamber to provide a flow path between the first chamber and the second chamber in which an airflow can recirculate between the first chamber and the second chamber, wherein the airflow can carry water vapor from the first chamber to the second chamber in the desorption mode of the water harvester; thermally coupling a cooling source to the second chamber, wherein the cooling source can operate to cool the water vapor carried in the airflow recirculated between said first chamber and said second chamber during the condensation mode of the water harvester; and fluidically coupling an airflow heat exchanger to the first chamber and the second chamber, said airflow passes through the airflow heat exchanger to transfer heat between the airflow from the first chamber and the airflow from the second chamber.

Another broad object of the invention can be a method of harvesting water from ambient atmosphere, including one or more of: directing ambient atmosphere to a water capture material, wherein the water capture material adsorbs water from the ambient atmosphere in an adsorption mode of the water harvester; operating a heating source thermally coupled to the water capture material contained in or fluidically coupled to the first chamber, the heat source operable to heat the water capture material to desorb water vapor from the water capture material during the desorption mode of said water harvester; recirculating an airflow carrying the water vapor between the first chamber and a second chamber fluidically coupled to the first chamber during the desorption mode of said water harvester; operating a cooling source thermally coupled to the second chamber, wherein the cooling source operates to cool the water vapor carried in the airflow recirculated between the first chamber and the second chamber during a condensation mode of said water harvester; and passing the airflow through an airflow heat exchanger to transfer heat between the airflow from the first chamber and the airflow from the second chamber. In particular embodiments, the method includes configuring or reconfiguring the airflow heat exchanger to transfer the heat between the airflow from said first chamber and the airflow from said second chamber at a heat transfer rate, wherein the heat transfer rate can avoid condensation of water vapor before entering the second chamber and/or reduces or cancels the sensible heat penalty in the system or water harvester associated with cooling of the "desorption-to-condensation" airflow and/or heating of the "condensation-to-desorption" to substantially reduce the total energy expenditure per liter of water produced during one or more water harvesting cycles.

In particular embodiments, the method can include operating a controller including a processor communicatively coupled to a non-transitory computer readable memory containing a computer code executable to analyze one or more signals from one or more sensors, wherein the signal varies based on change in one or more of: airflow temperature, airflow humidity, and airflow rate of the airflow passing through the airflow heat exchanger to control one or more of: the heat source, the cooling source, the configuration of the airflow heat exchanger, and the at least one air circulator, to avoid condensation of water vapor before entering the second chamber, and/or reduce or cancel the sensible heat penalty in the system or associated with cooling of the "desorption-to-condensation" airflow and/or heating of the "condensation-to-desorption" airflow to reduce the total energy expenditure per liter of water produced during one or more water harvesting cycles.

In particular embodiments, the method can include operating a heat pump configured to provide a condenser as the heating source to transfer heat from a heated fluid to the water capture material contained in or thermally coupled to the first chamber and/or operating a heat pump configured to provide an evaporator as the cooling source to transfer heat from said airflow carrying the water vapor contained in said second chamber.

Naturally, further objects of the invention are disclosed throughout other areas of the specification, drawings, photographs, and claims.

V. DETAILED DESCRIPTION OF THE INVENTION

The following description sets forth illustrative examples of a water harvesting system (1) (also referred to as the "system") including particular embodiments of a water harvester (2), methods of making a water harvester (2), and methods of using water harvester (2). It should be recognized, however, that the examples of the water harvesting system (1), the water harvester (2) and methods of making and using a water harvester (2) provided by the description are not intended to limit the breadth or scope of the description, but instead to provide examples sufficient for a person of ordinary skill in the art to make and use the full breadth and scope of the invention.

Now, with primary reference to FIGS. 1 through 5, embodiments of the water harvester (2) can include a first chamber (3) fluidically coupled to a second chamber (4) which defines a flow path (5) in which a airflow (6) can be recirculated between the first chamber (3) and the second chamber (4). The first chamber (1) can contain a water capture material (7), or hold one or more water capture module(s) (8) containing a water capture material (7), or receive one or more water capture module(s) (8) containing a water capture material (7) transferred by a mechanical transfer mechanism (9), or become fluidically coupled to (or decoupled from) one or more water capture module(s) (8) as part of the flow path (5) in which an airflow (6) can recirculate between the first chamber (3) and the second chamber (4). In particular embodiments, a plurality of water capture modules (8) can be contained in or fluidically coupled in series or parallel to the first chamber (3). The term "airflow" broadly encompasses a mixture of gases recirculated between the first chamber (3) and the second chamber (4) during the desorption mode (DM) and/or the condensation mode (CM) of the water harvester (2).

The water capture material (7) comprises a composition that can adsorb water (10) from surrounding ambient atmosphere (11) in an adsorption mode (AM) of the water harvester (2) and which desorbs water vapor (12) in a desorption mode (DM) of the water harvester (2). Any suitable water capture material (7) can be used in embodiments of the water harvesting system (1), the water harvester (2) and methods of making and using a water harvester (2) described herein. In particular embodiments, the water capture material (7) can, but need not necessarily, include one or more metal-organic frameworks ("MOFs"). See for example: H. Furukawa et al., *Water Adsorption in Porous Metal-Organic Frameworks and Related Materials*, J. Am. Chem. Soc. 2014, 136, 11, 4369-4381. MOFs may be characterized by high water uptake and step-like characteristics for water uptake versus relative humidity ("RH"). In some variations, suitable water capture materials (7), including MOFs, can have such an isotherm step, which can be tailored to various climates. See for example: International Patent Publication No. WO2020112899, Multivariate and Other Metal-Organic Frameworks, and Uses Thereof. The isotherm step is typically a weak function of temperature due to hydrogen binding between the MOF and water molecules. The step isotherm can enable water capture and release by MOF in a very narrow range of relative humidity ("RH").

In particular embodiments, different variations or combinations of MOF can be utilized, including one or more of: MOF-303: Al(OH)(HPDC), where HPDC is 1H-pyrazole-3,5-dicarboxylate; CAU-10: Al(OH)(IPA), where IPA is isophthalate; MOF-801: $Zr_6O_4(OH)_4(fumarate)_6$; MOF-841: $Zr_6O_4(OH)_4(MTB)_6(HCOO)_4(H2O)_2$; Aluminum Fumarate: Al(OH)(fumarate); MIL-160: Al(OH)(FDA), where FDA is 2,5-furandicarboxylate; MIL-53: Al(OH)(TPA), where TPA is terephthalate; or Aluminum Phosphate: AlPO4-LTA. In particular variations, the MOFs can have pore sizes in the range of about 0.5 nm to about 1 nm, or between about 0.7 nm to about 0.9 nm. In certain variations, the MOFs can have a hydrophilic pore structure. In certain variations, the MOFs can have a hydrophilic pore structure comprising acid and/or amine functional groups. In certain variations, the MOFs have one-dimensional channels that allow for reversible water adsorption. In some embodiments, the MOF can be mixed with a binder to improve its properties for adhesion to a substrate or support. Other suitable water capture material (s) (7) may include, as illustrative examples, certain molecular sieves (as one example, SAPO-34 a micropore zeolite, CAS No. 1318-02-1) and certain zeolites having the properties described above. Any combinations of the MOFs described herein, or other MOFs, or other compositions capable of water adsorption and water desorption may also be used alone or in combination.

In particular embodiments, the water capture material (7) can be disposed on one or more structural element(s) (13) located inside of a water capture module (8) or inside of the first chamber (3). The structural element(s) (13) can be configured to increase the surface area of the water capture material (7) exposed to the ambient atmosphere (11) to enhance water (10) adsorption from the air (11) during the adsorption mode (AM) of the water harvester (2) or enhance heat transfer to the water capture material (7) during the desorption mode (DM) of the water harvester (2). In particular embodiments, the structural element(s) (13) can include plates or fins (14) which can be independently coated on one or both sides with the water capture material (7). In some variations, the plates or fins (14) can be arranged in spatial relationship, and in particular embodiments arranged substantially parallel to each other, with a gap (15) existing between adjacent plates or fins (14). In particular embodiments, the gap (15) between adjacent plates relative to the length of each plate can be adjusted to achieve air flow to maximize water adsorption by the water capture material (7) during the adsorption mode (AM) or the desorption mode (DM). In some variations, the gap (15) between adjacent plates or fins (14) can about one percent (1%) to about 5% of the length of a plate or fin (14). In particular embodiments, the plates or fins (14) can be coated with layers of the water capture material (7) each having a thickness between about 10 microns to about 500 microns, or between about 50 microns to 500 microns, or between about 10 microns to about 50 microns. In particular embodiments, layers of water capture material (7) in these thickness ranges can allow for faster adsorption and/or desorption as compared to thicker layers of water capture material (7). In other embodiments, the plates or fins (14) can be coated with layers of the water capture material (7) each having a thickness of about 0.1 centimeter ("cm") to about 1 cm. Thickness in this range may allow for production of larger quantities of water vapor (12) during the desorption mode (DM) as compared to thinner layers. In certain embodiments, each layer of the water capture material (7) on the plates or fins (14) can have a porosity. In some variations, the calculated porosity (the volume of the pores in the water capture material divided by the total volume of the water capture material×100) can be at least about 40%, at least about 50%, at least about 60%, at least about 70%, or at least about 80%; or about 40% to about 90%, about 50% to about 90%, about 40% to about 80%, about 50% to about 80%, or about 60% to about 80%. In other embodiments, the layer of the water capture material (7) can be substantially nonporous. In particular embodiments, the thickness of the layer of the water capture material (7) can be greater than the thickness of a plate for fin (14). In certain embodiments, only one side of the plate of fin (14) may be coated with water capture material (7) with the thickness of the water capture material relative to the thickness of the plate of fin (14) adapted to reduce or minimize the amount of energy used per unit of water released from the water capture material (7) during the desorption mode (DM) of the water harvester (2). Similarly, in certain embodiments, both sides of the plate or fin (14) can be coated with the water capture material (7) and the ratio of the thickness of the first layer (e.g., first side layer) of the water capture material (7) to the thickness of the plate or fin (14) to the thickness of the second layer (e.g., second side layer) of the water capture material (7) can be adapted to reduce or minimize the amount of energy used per unit of water released from the water capture material (7) during the desorption mode (DM) of the water harvester (2). The plates or fins (14) may be made of any suitable material, including any suitable metal or plastic. As an illustrative example, the plates can comprise one or more of aluminum, copper, iron, nickel, tungsten. In some variations, the plates comprise a solid metal. In other variations, each plate or fin (14) can have a cellular design defining small channels or corrugates. In other variations, each plate or fin (14) can further include topographic features that enhance water adsorption. Illustrative examples of topographical features include one or more of: granulation, perforations, arc holes, bumps, ridges, or grooves, or any combination thereof. In another variation, the plates or fins can comprise a mesh.

Figure 1:
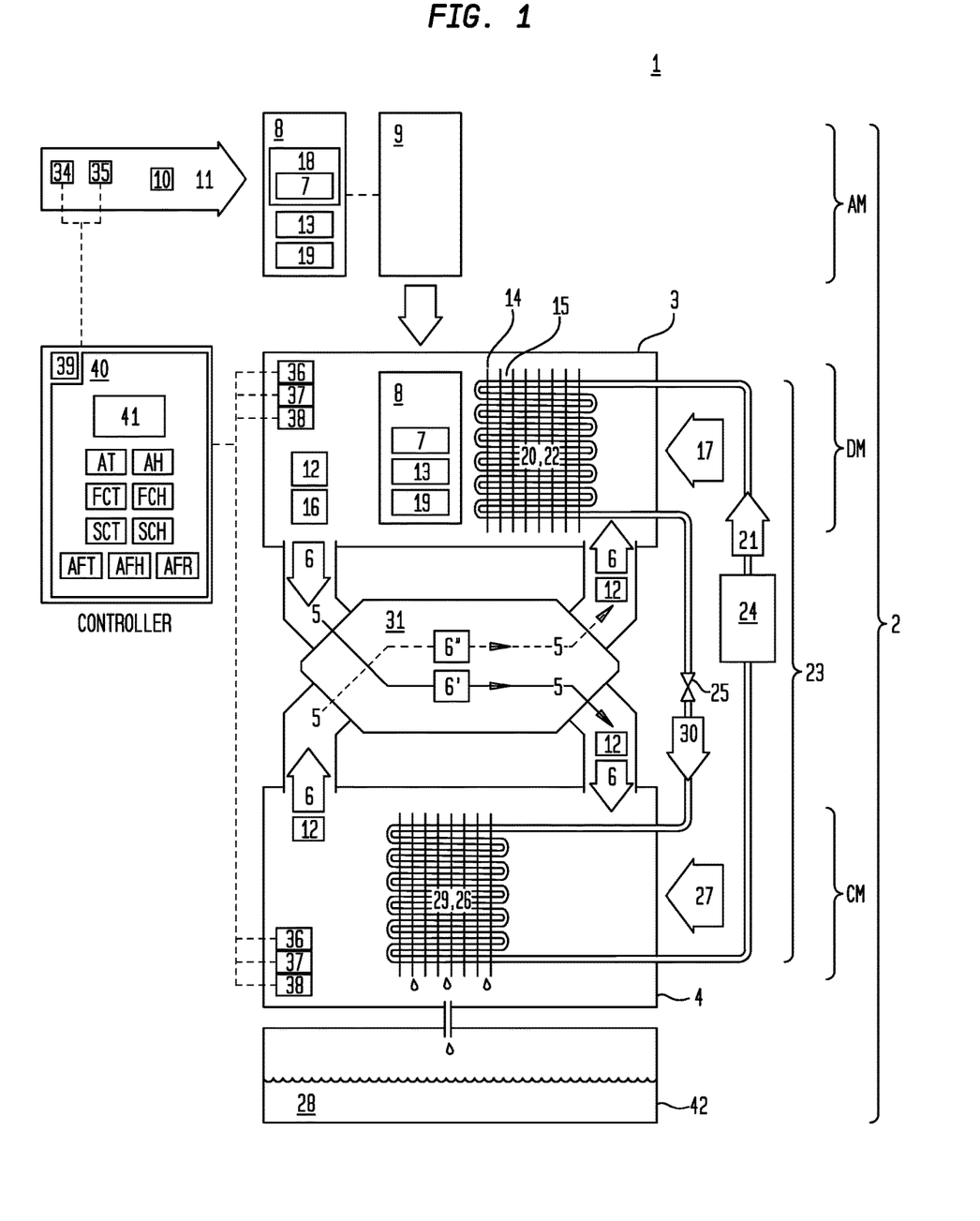
FIG. 1 is a block flow diagram of particular embodiments of the water harvesting system and water harvester.
Figure 2:
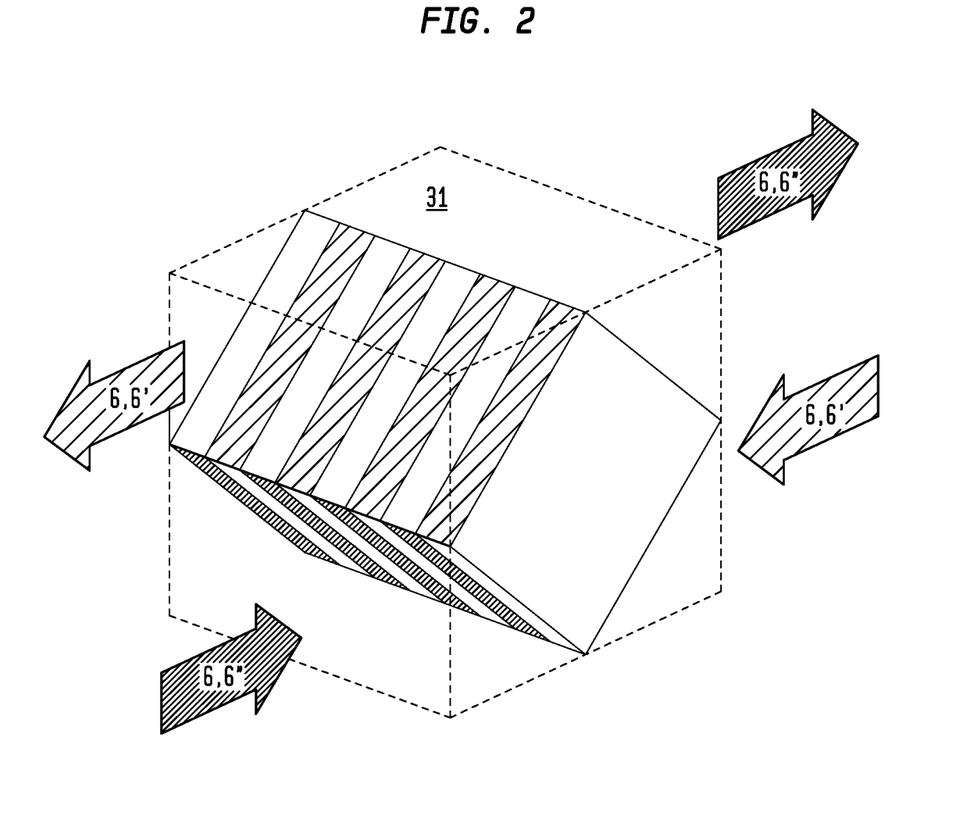
FIG. 2 is a block flow diagram of a particular embodiment of an airflow heat exchanger.

Again, with primary reference to FIG. 1, in the adsorption mode (AM) of the water harvester (2), the water capture material (7) absorbs water (10) from the surrounding ambient atmosphere (11). In some embodiments, the structural elements (13) can be designed and arranged to allow for diffusion of water (10) from surrounding ambient atmosphere (11) to the water capture material (7) during the adsorption mode (AM). In particular embodiments, an air circulator (16) can operate to generate an airflow (6) at determined velocity through the water capture material (7) to assist adsorption of water (10) by the water capture material (7). As an illustrative example, the water capture material (7) can be coated on adjacent structural elements (13), and ambient atmosphere (11) can passthrough the gap (15) between the structural elements (13) during the adsorption phase. The adsorption mode (AM) of the water harvester (2) can conclude when the water capture material (7) reaches a target level of water saturation and/or a target rate of adsorption.

Now, with primary reference to FIG. 1, a heating source (17) can be thermally coupled to the water capture material (7). The water capture material (7) thermally coupled to the heating source (17) can be contained in the first chamber (1), contained in one or more water capture module(s) (8) held in the first chamber (3), contained one or more water capture modules transferred by a transfer mechanism (9) to the first chamber (3), or contained in one or more water capture modules (8) fluidically coupled as part of the flow path (5) in which the airflow (6) can recirculate between the first chamber (3) and the second chamber (4). The heat source (17) can operate to heat the water capture material (7) to desorb water vapor (12) during the desorption mode (DM) of the water harvester (2). There are two heating methods to release water vapor (12) from the water capture material (7): first, direct heating that involves heat transfer from the heat source (17) directly to the surface of first chamber surface (3), to structural elements (13) supporting the water capture material (7), or to the water capture material (7), or combinations thereof; and second, indirect heating that involves heating the space inside of the first chamber (3) (3), surrounding the structural elements (13) supporting the water capture material (7), or the water capture material (7). The heat source (17) can comprise any mechanism, object, area, material, composition, byproduct, waste energy, or energy, and combinations thereof, that can used to sufficiently heat the water capture material (7) to release water vapor (12). Typically, the heat source (3) operates at temperatures in the range of about 80° C. (about 176° F.) to about 160° C. (about 320° F.). Specific temperatures within the temperature range can be dependent upon the water capture material(s) (7), or combinations of water capture materials (7), utilized in the water harvesting system (1) or water harvester (2). However, this is not intended to preclude embodiments which exploit temperatures outside the range to release water vapor (12) from the water capture material (7).

In particular embodiments, direct heating can comprise at least one structural element (13) being a conductive element (19) resistively heated by flowing electricity to facilitate desorption of water vapor (12) from the water capture material (7) coated on the conductive element (19). In some embodiments, electrical power applied to the conductive element (19) can be tailored to achieve a pre-determined desorption time, as the rate of water desorption is related to the applied electrical power.

In particular embodiments, indirect heating can comprise using resistive heating in which a resistively heated conductive element (19) transfers heat to the air (18) surrounding the water capture material (7) to release water vapor (12).

In particular embodiments, indirect heating can comprise directing waste heat produced by a machine or other process discrete from the water harvester (2) proximate to or into the first chamber (3).

In particular embodiments, the heating source (17) can comprise a first heat exchanger (20) through which heated fluid (21) circulates. The first heat exchanger (20) can be configured to transfer heat from the heated fluid (21) to the water capture material (7). In certain variations, the first heat exchanger (3) can transfer heat from the heated fluid (21) to one or more of: the structure of the first chamber (3), the structure of one or more water capture modules (8) held or received by the first chamber (3), the structural elements (13) supporting the water capture material (7), or direct to the water capture material (7) coating the heating source (17).

In particular embodiments, the heating source (17) can comprise a condenser (22) of a heat pump (23). A heat pump (23) can include a compressor (24), an expansion valve (25), a condenser (22) (or hot-side heat exchanger), and an evaporator (26) (or cold-side heat exchanger). The compressor (24) can operate to compress a refrigerant resulting in a heated fluid (21) which can be circulated to the condenser (22). The expansion valve (25) can be configured to receive the heated fluid (21) from the condenser (22). The expansion valve (25) can operate to allow expansion of the heated fluid (21) to produce a cooled fluid (27). The cooled fluid can circulate to the evaporator (26). In particular embodiments, the condenser (22) (or hot side of the heat exchanger) can be set to operate at temperatures in the range of about 90° C. (about 194° F.) to about 160° C. (about 320° F.), and the evaporator (26) or cold-side heat exchanger can be set to operate at temperatures in the range of about 30° C. (about 86° F.) to about 95° C. (about 203° F.). The condenser (22) can be associated with the first chamber (3) to transfer heat, whether directly or indirectly, to the water capture material (7) contained in, fluidically couple to, or thermally coupled to, the first chamber (3). As illustrative examples, the condenser (22) can be disposed to transfer heat to sufficiently raise the temperature of the water capture material (7) to release water vapor (12) from the water capture material (7) in the desorption mode (DM) of the water harvester (2).

Now, with primary reference to FIG. 1, embodiments of the water harvesting system (1) or water harvester (2) can include a second chamber (4) fluidically coupled to the first chamber (3). The water vapor (12) released from the water capture material (7) can be carried in the airflow (6) recirculated in the flow path (5) between the first chamber (3) and the second chamber (4) during the desorption mode (DM) of the water harvester (2). In particular variations, upon reaching a target water vapor concentration in the first chamber (3), the air circulator (16) can operate to recirculate the airflow (6) between the first chamber (3) and the second chamber (4) during the desorption mode (DM) of said water harvester (2). Recirculation of the airflow (6) between the first chamber (3) and the second chamber (4) can initiate the condensation mode (CM) of the water harvester (2).

Again, with primary reference to FIG. 1, a cooling source (27) can be thermally coupled to the second chamber (4). The cooling source (27) can operate to cool the water vapor (12) carried in the fluid flow (6) recirculated between said first chamber (3) and the second chamber (4) during the condensation mode (CM) of the water harvester (2). The cooling source (27) can sufficiently cool the water vapor (12) in or passing through the second chamber (4) to cause condensation of at least a portion of the water vapor (12) carried by the airflow (6) into liquid water (28). In particular embodiments, the cooling source (27) can be disposed to cool the structure of the second chamber (4) to a temperature lower than the dewpoint of the fluid flow (6) within the second chamber (4) to cause condensation of at least a portion of the water vapor (12) carried by the fluid flow (6) into liquid water (28). The second chamber (4) can be configured increase the surface area of the internal surfaces of the second chamber (4) to increase condensation of water vapor (12) in the fluid flow (6) within the second chamber (4). In other embodiments, the cooling source (27) can be disposed inside of the second chamber (4) and the fluid flow (6) carrying water vapor (12) can pass over the cooling source (27) to cause condensation of at least a portion of the water vapor (12) within the second chamber (4). In particular embodiments, the cooling source (27) can comprise waste cold produced by a machine or other process discrete from the water harvester (2) directed proximate to or into the second chamber (4). An illustrative example, waste cold can comprise the re-gasification of liquid natural gas from the frozen state. In other embodiments, the cooling source (27) can comprise a second heat exchanger (29) through which a cooled fluid (30) circulates. The second heat exchanger (29) can be disposed proximate to in the second chamber (4) to cool the airflow (6) carrying the water vapor (12) contained in or passing through the second chamber (4). The airflow (6) can be cooled to below the dewpoint to cause condensation of at least a portion of the water vapor (12) into liquid water (28).

In particular embodiments, the cooling source (27) can be an evaporator (26) of a heat pump (23). The evaporator (26) or cold-side heat exchanger can be set to operate at temperatures in the range of about 30° C. (about 86° F.) to about 95° C. (about 203° F.). The evaporator (26) can be associated with the second chamber (4) to transfer heat, whether directly or indirectly, from the airflow (6) carrying water vapor (12) contained in or passing through the second chamber (4). As illustrative examples, the evaporator (26) can be disposed to transfer heat from one or more of the structure of the second chamber (4), from structural elements (13) within the second chamber (4), from the airflow (6) within the second chamber (4), or otherwise disposed to cause a decrease in temperature of the fluid flow (6) sufficient to cause condensation of at least a portion of the water vapor (12) carried by the fluid flow (6) in the condensation mode (CM) of the water harvester (2).

Now, with primary reference to FIGS. 1 through 5, embodiments of the water harvester (2) can include an airflow heat exchanger (31). For the purposes of this invention, the term airflow heat exchanger (31) means any device adapted to or configured to bring portions of the airflow (6) of different temperatures into thermal contact, transferring heat between the first airflow portion (6') and the second airflow portion (6"), As illustrative examples, the term airflow heat exchanger (31) encompasses air to air heat exchangers, parallel heat exchangers, counter flow heat exchangers, cross flow heat exchangers, and combinations thereof. In particular embodiments, the water harvester (2) can include an airflow heat exchanger (31) through which the recirculated airflow (6) passes portions of the fluid flow (6) in parallel flow or counter flow direction in thermal contact to transfer heat between the first fluid flow portion (6') passing from the first chamber (3) to the second chamber (4) to a physically separated second fluid flow portion (6") passing from said second chamber (4) to the first chamber (3). In particular embodiments, hot humid air generated in the first chamber (3) during the desorption mode (DM) of the water harvester (2) and passing from the first chamber (3) can be directed into one or more inlets of the airflow heat exchanger (31). Simultaneously, the cold dry air passing from the second chamber (4) during the condensation mode (CM) of the water harvester (2) can be directed into one or more inlets of the airflow heat exchanger (31) to transfer heat from the hot humid fluid to the cold dry air to correspondingly pre-cool the hot humid air and to pre-heat the cold dry air.

Now, with primary reference to FIGS. 1 through 5, in particular embodiments, the airflow heat exchanger (31) can have a fixed spatial structural configuration. In these embodiments, one or more of: the structural material of airflow heat exchanger (31), the temperature of airflow (6) passing from the first chamber (3), the temperature of the airflow (6) passing from the second chamber (4), and the airflow rate through the airflow heat exchanger (31) can be preselected or coordinated to reduce, substantially preclude or preclude condensation of the water vapor (12) carried by the recirculated airflow (6) prior to entry into the second chamber (4). The coordination of these various parameters, rather than altering the geometry of the counterflow heat exchanger (31), can afford a mechanically less complicated embodiment of the water harvester (2). As shown in the illustrative examples of FIGS. 2 through 5, numerous variations in the internal and external structural geometry of the airflow heat exchanger (31) can be suitable for use with particular embodiments of the invention. An illustrative example of an airflow heat exchanger (31) suitable for use with particular embodiments of the invention can be obtained from Xiamen Air Technology Co., Ltd., No. 80, Siming Industrial Park, Mei Xi Road, Tong' an District, Xiamen 361100, Fujian, China.

Figure 3:
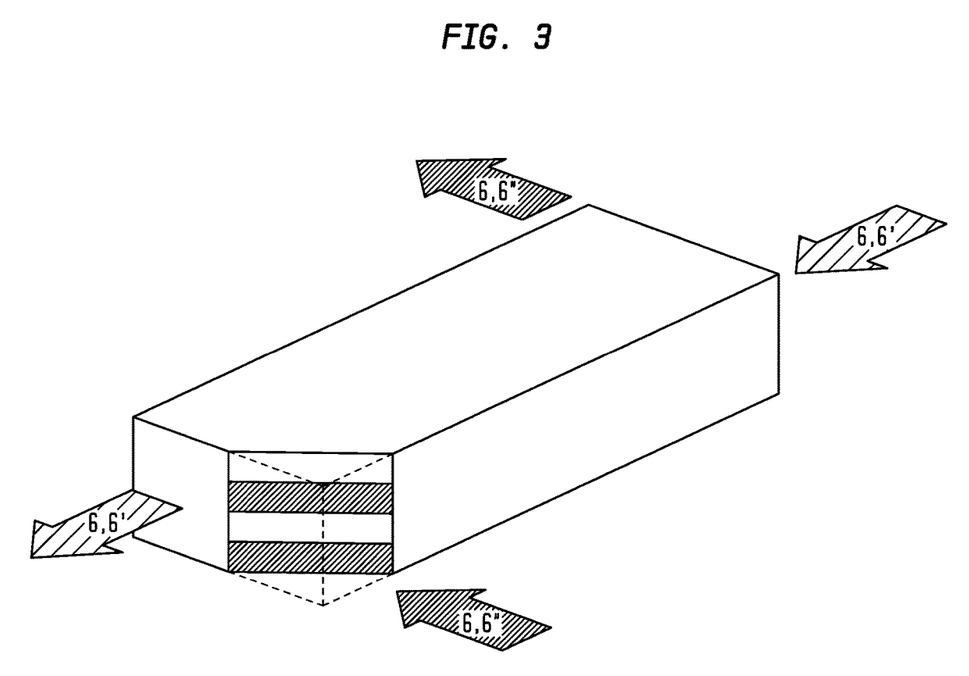
FIG. 3 is a block flow diagram of another particular embodiment of an airflow heat exchanger.
Figure 4:
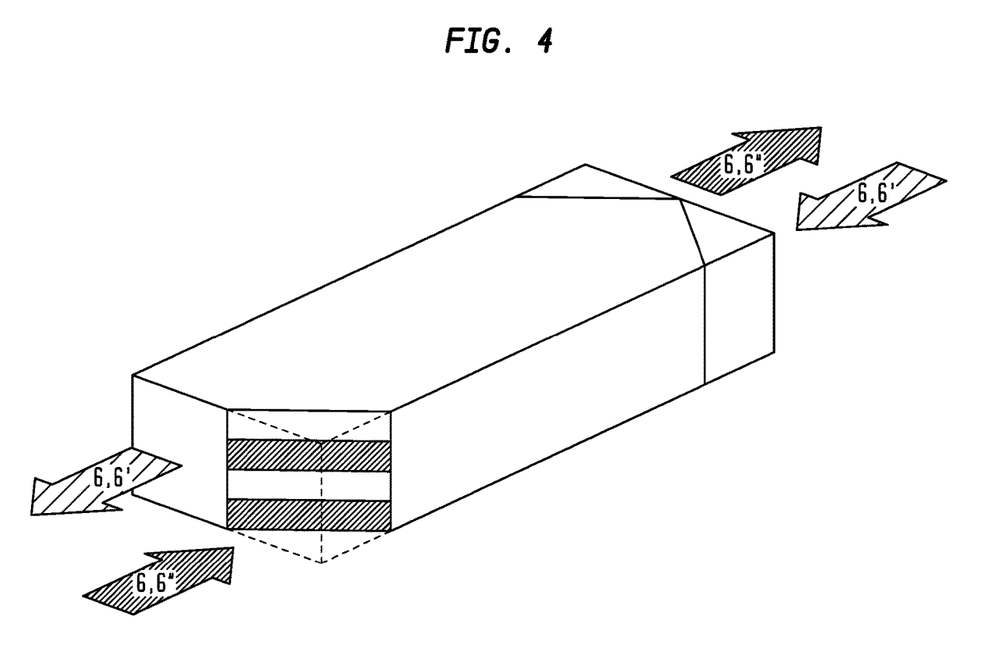
FIG. 4 is a block flow diagram of another particular embodiment of an airflow heat exchanger.
Figure 5:
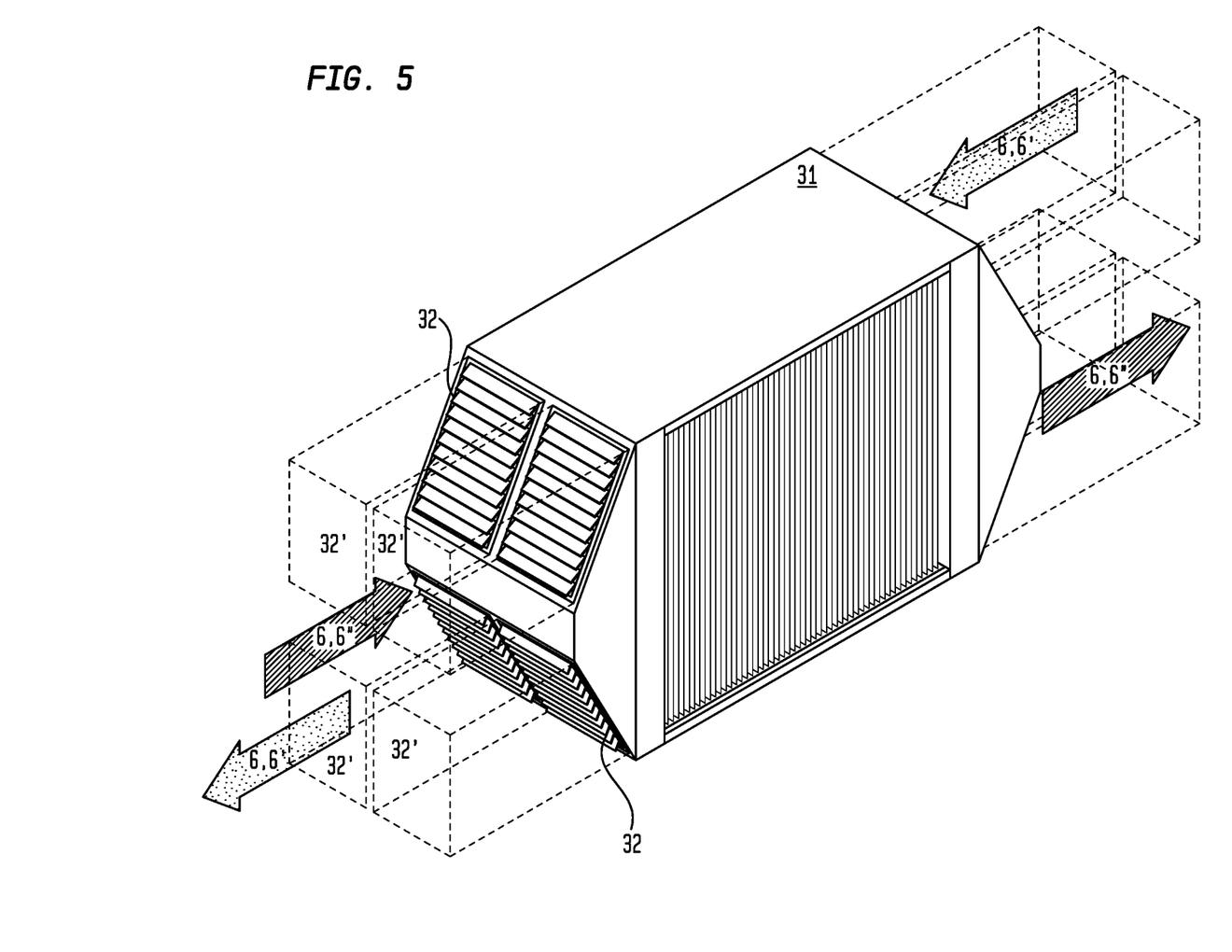
FIG. 5 is a block flow diagram of another particular embodiment of an airflow heat exchanger.

Now, with primary reference to FIGS. 1 and 3, in particular embodiments, the airflow heat exchanger (31) can have a structure that can be reconfigured prior to operation or during operation of the water harvester (2) to adjust transfer of heat between the airflow (6) from the first chamber (3) and the airflow (6) from the second chamber (4). This allows for adjustment of the heat transfer rate to accommodate changes in operating parameters of the water harvester (2) including one or more of: the temperature of airflow (6) passing from the first chamber (3), the temperature of the airflow (6) passing from the second chamber (4), and the airflow rate through the airflow heat exchanger (31). In particular variations this allows for a wider range of operating parameters in the water harvester (2) which concurrently reduce, substantially preclude or preclude condensation of the water vapor (12) carried by the recirculated airflow (6) prior to entry into the second chamber (4). In the illustrative example of FIG. 5, the airflow heat exchanger (31) can include dampers (32) that can be adjusted to alter the open area (32) of one flow path (5) through the airflow heat exchanger (31) to correspondingly adjust the airflow rate from the first chamber (3) and/or the airflow rate from the second chamber (4).

In some variations, the water harvesting system (1) or the water harvester (2) can further include a controller (33) coupled to one or more ambient atmosphere temperature sensors (34) and/or one or more ambient atmosphere humidity sensors (35) located outside of the first chamber (3) and the second chamber (4) adapted to or configured to generate a signal that varies with change in ambient atmosphere temperature and/or ambient atmosphere humidity of the environment surrounding one or more components of the water harvesting system (1), or the water harvester (2). The controller (33) can be respectively coupled to one or more temperature sensors (36) and/or one or more humidity sensors (37) and/or one or more airflow sensors (38) that can be respectively located inside the first chamber (3) and/or the second chamber (4) adapted to or configured to generate a signal that varies with change in the first chamber temperature and/or humidity, and/or second chamber temperature and/or humidity. The controller (33) can include a processor (39) communicatively coupled to a non-transitory computer readable memory (40) containing a water harvesting algorithm (41) (also referred to as the "algorithm") under control of the processor (39) to analyze the signal from each sensor (34, 35, 36, 37, 38) to measure one or more of: the ambient atmosphere temperature (AT), the ambient atmosphere humidity (AH), the first chamber temperature (FCT) and/or first chamber humidity (FCH), the second chamber temperature (SCT) and/or second chamber humidity (SCH), the airflow temperature (AFT), airflow humidity (AFH), and airflow rate (AFR) of the fluid flow (6, 6', 6") passing through the airflow heat exchanger (31), and combinations thereof.

The first chamber temperature (FCT) and/or first chamber humidity (FCH) measurements and/or the second chamber temperature (SCT) and/or the second chamber humidity (SCH) and the ambient atmosphere temperature (AT) and/or ambient atmosphere humidity (AH) measurements can be used under the control of the controller (33) implementing a water harvesting algorithm (41) to adjust operating parameters of the water harvester (2), with respect to one or more of: the period of time allocated to the adsorption mode (AM) in which ambient atmosphere (11) flows over the water capture material (7), the temperature of in the first chamber (3)(FCT) during the desorption mode (DM) and the period of time allocated to the desorption mode (DM), the temperature of the second chamber (4)(SCT) during the condensation mode (CM) and the period of time allocated to the condensation mode (CM), operation of the air circulator (16) to adjust airflow rate (AFR) between the first chamber (3) and the second chamber (4), reconfigure the airflow heat exchanger (31) to increase or decrease the area of the flow path (5) through the airflow heat exchanger (31) in one or both directions, and in particular embodiments control operation of the heat pump (23).

Now, with primary reference to Examples 1 through 4 and Table 1, embodiments of the water harvester (2) that include an airflow heat exchanger (31) can substantially reduce the amount of energy used by the water harvesting system (1) or the water harvester (2) to produce a unit of liquid water (28), which can be directed to a water collection tank (42).

Inclusion of the airflow heat exchanger (31) can substantially reduce or alleviate the sensible energy penalty of the recirculated fluid flow (6) between the first chamber (3) and the second chamber (4). The reduction or alleviation of the sensible energy penalty can reduce the amount of energy used by the water harvesting system (1) to re-heat and to re-cool the fluid flow (6) between the first chamber (3) and the second chamber (4) resulting in a reduction in energy used by the water harvesting system (1) or water harvester (2) to produce a unit of liquid water (28).

An unexpected result also occurs when the sensible heat penalty from both re-cooling and re-heating the fluid flow (6) between the first chamber (3) and second chamber (4) cancels out. In that event, a very substantial unexpected advantage occurs in that the temperature difference between the first chamber (3) and the second chamber (4) can be substantially decreased, which can afford a very substantial increase in the overall energy efficiency of the water harvesting system (1) or the water harvester (2).

Example 1

CAU-10 having an isotherm step of 20% RH at 25° C. (about 77° F.) was used as the water capture material (7). The water capture material (7) was desorbed in the first chamber (3) at a desorption temperature of about 85° C. (about 185° F.). The second chamber (4) was maintained at a condensation temperature of about 30° C. (about 86° F.). No airflow heat exchanger (31) was used in the flow path (5) of the fluid flow (6) between the first chamber (3) and the second chamber (4). The absolute humidity in the first chamber (3) was about 90 grams of water per cubic meter of air (90 g $H_2O/m^3$ air). The absolute humidity in the second chamber was about 30 grams of moisture per cubic meter of air (30 g $H_2O/m^3$ air). The amount of airflow (6) recirculated between the first chamber (3) and the second chamber (4) to desorb one gram (1 g) of water (10) from the water capture material (7) in the first chamber (3) and condense greater than 0.95 gram (>0.95 g) of liquid water (28) in the second chamber (4) was about 0.016 cubic meters of air (0.016 $m^3$ air). The sensible penalty contribution from heating and cooling the recirculated 0.016 $m^3$ of air to desorb 1 g of water (10) from the water capture material (7) in the first chamber (3) and condense >0.95 g of liquid water (28) in the second chamber (4) compared to the total amount of energy used to produce >0.95 g of liquid water (28) in the second chamber (4) was approximately 20%. The total energy cost was about 0.35 kilowatt per liter of water (about 0.35 kWh/L). The sensible heat penalty due to cooling and heating the airflow (6) recirculated between the first chamber (3) and the second chamber (4) was about 0.07 kWh/L.

Example 2

CAU-10 having an isotherm step of 20% RH at 25° C. (about 77° F.) was used as the water capture material (7). The water capture material (7) was desorbed in the first chamber (3) at a desorption temperature of about 85° C. (about 185° F.). The second chamber (4) was maintained at a condensation temperature of about 50° C. (about 122° F.). No airflow heat exchanger (31) was used in the flow path (5) of the fluid flow (6) between the first chamber (3) and the second chamber (4). The absolute humidity in the first chamber (3) was about 80 grams of water per cubic meter of air (80 g $H_2O/m^3$ air). The absolute humidity in the second chamber was about 80 grams of moisture per cubic meter of air (about 80 g $H_2O/m^3$ air). The amount of airflow (6) recirculated between the first chamber (3) and the second chamber (4) to desorb one gram (1 g) of water (10) from the water capture material (7) in the first chamber (3) and condense greater than 0.95 gram (>0.95 g) of liquid water (28) in the second chamber (4) was about 0.108 cubic meters of air (0.108 $m^3$ air). The sensible penalty contribution from heating and cooling the recirculated 0.108 $m^3$ of air to desorb 1 g of water (10) from the water capture material (7) in the first chamber (3) and condense >0.95 g of liquid water (28) in the second chamber (4) compared to the total amount of energy used to produce >0.95 g of liquid water (28) in the second chamber (4) was about 50%. The total energy cost was about 0.50 kWh/L kilowatt per liter of water (about 0.50 kWh/L). The sensible heat penalty due to cooling and heating the airflow (6) recirculated between the first chamber (3) and the second chamber (4) was about 0.25 kWh/L.

Example 3

CAU-10 having an isotherm step of 20% RH at 25° C. (about 77° F.) was used as the water capture material (7). The water capture material (7) was desorbed in the first chamber (3) at a desorption temperature of about 85° C. (about 185° F.). The second chamber (4) was maintained at a condensation temperature of about 30° C. (about 86° F.). An airflow heat exchanger (31) was used in the flow path (5) of the fluid flow (6) between the first chamber (3) and the second chamber (4). The absolute humidity in the first chamber (3) was about 90 grams of water per cubic meter of air (90 g $H_2O/m^3$ air). The absolute humidity in the second chamber was about 30 grams of moisture per cubic meter of air (about 80 g $H_2O/m^3$ air). The amount of airflow (6) recirculated between the first chamber (3) and the second chamber (4) to desorb one gram (1 g) of water (10) from the water capture material (7) in the first chamber (3) and condense greater than 0.95 gram (>0.95 g) of liquid water (28) in the second chamber (4) was about 0.016 cubic meters of air (0.016 $m^3$ air). The sensible penalty contribution from heating and cooling the recirculated 0.108 $m^3$ of air to desorb 1 g of water (10) from the water capture material (7) in the first chamber (3) and condense >0.95 g of liquid water (28) in the second chamber (4) compared to the total amount of energy used to produce >0.95 g of liquid water (28) in the second chamber (4) was reduced to near zero or zero. The total energy cost was about 0.28 kWh/L kilowatt per liter of water (about 0.28 kWh/L).

Example 4

CAU-10 having an isotherm step of 20% RH at 25° C. (about 77° F.) was used as the water capture material (7). The water capture material (7) was desorbed in the first chamber (3) at a desorption temperature of about 85° C. (about 185° F.). The second chamber (4) was maintained at a condensation temperature of about 30° C. (about 86° F.). An airflow heat exchanger (31) was used in the flow path (5) of the fluid flow (6) between the first chamber (3) and the second chamber (4). The absolute humidity in the first chamber (3) was about 90 grams of water per cubic meter of air (90 g $H_2O/m^3$ air). The absolute humidity in the second chamber was about 30 grams of moisture per cubic meter of air (about 80 g $H_2O/m^3$ air). The amount of airflow (6) recirculated between the first chamber (3) and the second chamber (4) to desorb one gram (1 g) of water (10) from the water capture material (7) in the first chamber (3) and condense greater than 0.95 gram (>0.95 g) of liquid water (28) in the second chamber (4) was about 0.108 $m^3$ cubic meters of air (0.108 $m^3$ air). The sensible penalty contribution from heating and cooling the recirculated 0.108 $m^3$ of air to desorb 1 g of water (10) from the water capture material (7) in the first chamber (3) and condense >0.95 g of liquid water (28) in the second chamber (4) was reduced to near zero or zero. The total energy cost was about 0.25 kWh/L kilowatt per liter of water (about 0.25 kWh/L).

TABLE 1

SUMMARY OF RESULTS

| Example | Counter Current Heat Exchanger | Condensation Temperature (deg C.) | Recirculated volume of air needed ($m^3$) | Sensible penalty contribution (%) | Total energy cost (kWh/L) |
|---|---|---|---|---|---|
| 1 | No | 30 | 0.016 | ~20 | <0.35 |
| 2 | No | 50 | 0.108 | >50 | >0.5 |
| 3 | Yes | 30 | 0.016 | ~0 | <0.28 |
| 4 | Yes | 50 | 0.018 | ~0 | <0.25 |

As can be easily understood from the foregoing, the basic concepts of the present invention may be embodied in a variety of ways. The invention involves numerous and varied embodiments of a water harvesting system (1), a water harvester (2) and methods for making and using such water harvesting system (1) and water harvester (2) including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "water harvester" should be understood to encompass disclosure of the act of "water harvesting"—whether explicitly discussed or not—and, conversely, were there is a disclosure of the act of "water harvesting", such a disclosure should be understood to encompass disclosure of a "water harvester" and even a "means for water harvesting". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the water harvesting systems or water harvesters herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A water harvester, comprising:
   a first chamber containing or coupled to a water capture material, said water capture material adsorbs water from surrounding ambient atmosphere in an adsorption mode of said water harvester, said water capture material desorbs water vapor in a desorption mode of said water harvester;
   a heat source thermally coupled to said water capture material, said heat source operable to heat said water capture material to desorb said water vapor during said desorption mode of said water harvester;
   a second chamber fluidically coupled to said first chamber, said water vapor carried in an airflow recirculated between said first chamber and said second chamber during said desorption mode of said water harvester;
   a cooling source thermally coupled to said second chamber, said cooling source operable to cool said water vapor carried in said airflow recirculated between said first chamber and said second chamber during said a condensation mode of said water harvester; and
   an airflow heat exchanger through which said airflow passes to transfer heat between said airflow from said first chamber and said airflow from said second chamber;
   at least one air circulator operable to recirculate said airflow between said first chamber and said second chamber during said desorption mode and/or said condensation mode of said water harvester;
   one or more sensors configured to sense said airflow, said one or more sensors generating a signal which varies based on one or more of: airflow temperature, airflow humidity, and airflow rate; and
   a controller including a processor communicatively coupled to a non-transitory computer readable memory containing a computer code under control of said processor to analyze said signal which varies based on change of one or more of: said airflow temperature, said airflow humidity, and said airflow rate of said airflow passing through said airflow heat exchanger, wherein said controller operable based on analysis of said signal to control one or more of: said heat source, said cooling source, and said at least one air circulator to avoid condensation of said water vapor carried in said airflow before entering said second chamber.

2. The water harvester of claim 1, wherein said airflow heat exchanger reconfigurable to adjust heat transfer rate between said airflow from said first chamber and said airflow from said second chamber.

3. The water harvester of claim 1, wherein said water capture material disposed in one or more water capture modules located inside of said first chamber.

4. The water harvester of claim 1, wherein said water capture material disposed on a support structure configured to increase the surface area of said water capture material exposed to said ambient atmosphere or said airflow.

5. The water harvester of claim 4, wherein said support structure comprises one or more fins or one or more plates.

6. The water harvester of claim 1, wherein said water capture material comprises one or more water capture materials.

7. The water harvester of claim 6, wherein said one or more water capture materials comprise a metal-organic framework.

8. The water harvester of claim 1, wherein said heat source comprises a first heat exchanger through which heated fluid circulates, said first heat exchanger configured to transfer heat from said heated fluid to said water capture material contained in or coupled to said first chamber.

9. The water harvester of claim 8, wherein said cooling source comprises a second heat exchanger through which cooled fluid circulates, said second heat exchanger cools said airflow carrying said water vapor in said second chamber.

10. The water harvester of claim 1, further comprising a water collection tank coupled to said second chamber.

11. A water harvester, comprising:
a first chamber containing or coupled to a water capture material, said water capture material adsorbs water from surrounding ambient atmosphere in an adsorption mode of said water harvester, said water capture material desorbs water vapor in a desorption mode of said water harvester;
a heat source thermally coupled to said water capture material, said heat source operable to heat said water capture material to desorb said water vapor during said desorption mode of said water harvester;
a second chamber fluidically coupled to said first chamber, said water vapor carried in an airflow recirculated between said first chamber and said second chamber during said desorption mode of said water harvester;
a cooling source thermally coupled to said second chamber, said cooling source operable to cool said water vapor carried in said airflow recirculated between said first chamber and said second chamber during a condensation mode of said water harvester; and
an airflow heat exchanger through which said airflow passes to transfer heat between said airflow from said first chamber and said airflow from said second chamber,
wherein said heat source comprises a condenser of a heat pump.

12. The water harvester of claim 11, wherein said cooling source comprises an evaporator of a heat pump.

13. The water harvester of claim 12, wherein said heat pump includes one or more of:
a compressor, configured to produce said heated fluid, wherein said heated fluid circulates to said condenser; and
an expansion valve, configured to receive said heated fluid from the condenser, said expansion valve operable to allow expansion of the heated fluid to produce a cooled fluid, wherein the cooled fluid circulates to said evaporator.

14. The water harvester of claim 13, wherein said heated fluid and said cooled fluid comprise a refrigerant.

15. The water harvester of claim 11, wherein said airflow heat exchanger configured to transfer said heat between said airflow from said first chamber and said airflow from said second chamber.

16. The water harvester of claim 15, wherein said airflow heat exchanger reconfigurable to adjust heat transfer rate between said airflow from said first chamber and said airflow from said second chamber.

17. The water harvester of claim 11, further comprising at least one air circulator operable to recirculate said airflow between said first chamber and said second chamber during said desorption mode and/or said condensation mode of said water harvester.

18. The water harvester of claim 17, further comprising one or more sensors configured to sense said airflow, said one or more sensors generating a signal which varies based on one or more of: airflow temperature, airflow humidity, and airflow rate.

19. The water harvester of claim 18, further comprising a controller including a processor communicatively coupled to a non-transitory computer readable memory containing a computer code under control of said processor to analyze said signal which varies based on change of one or more of: said airflow temperature, said airflow humidity, and said airflow rate of said airflow passing through said airflow heat exchanger.

20. The water harvester of claim 19, wherein said controller operable based on analysis of said signal to control one or more of: said heat source, said cooling source, and said at least one air circulator to avoid condensation of said water vapor carried in said airflow before entering said second chamber.

21. The water harvester of claim 11, wherein said water capture material disposed in one or more water capture modules located inside of said first chamber.

22. The water harvester of claim 11, wherein said water capture material comprises one or more water capture materials.

23. The water harvester of claim 22, wherein said one or more water capture materials comprise a metal-organic framework.

* * * * *